(12) United States Patent
Dircks et al.

(10) Patent No.: US 7,815,617 B2
(45) Date of Patent: Oct. 19, 2010

(54) LAMINATED MATERIAL AND SKIN CONTACTING PRODUCTS FORMED THEREFROM

(75) Inventors: Lon E. Dircks, Salem, WI (US); Michael G. Taylor, Mundelein, IL (US); Claudio Giori, Riverwoods, IL (US)

(73) Assignee: Hollister Incorporated, Libertyville, IL (US)

( * ) Notice: Subject to any disclaimer, the term of this patent is extended or adjusted under 35 U.S.C. 154(b) by 733 days.

(21) Appl. No.: 11/569,947

(22) PCT Filed: Jun. 2, 2005

(86) PCT No.: PCT/US2005/019496

§ 371 (c)(1), (2), (4) Date: Jan. 22, 2007

(87) PCT Pub. No.: WO2005/120827

PCT Pub. Date: Dec. 22, 2005

(65) Prior Publication Data

US 2008/0269701 A1   Oct. 30, 2008

Related U.S. Application Data

(63) Continuation-in-part of application No. 10/861,560, filed on Jun. 4, 2004.

(51) Int. Cl.
*A61M 1/00* (2006.01)
(52) U.S. Cl. ...................................... 604/332
(58) Field of Classification Search .......... 604/322, 604/332, 333, 336, 337; 442/327, 361, 364, 442/381, 389, 394, 399, 398
See application file for complete search history.

(56) References Cited

U.S. PATENT DOCUMENTS

| | | |
|---|---|---|
| 4,490,145 A | 12/1984 | Campbell |
| 4,681,793 A | 7/1987 | Linman et al. ............ 428/138 |
| 4,718,898 A | 1/1988 | Puletti et al. ............. 604/366 |
| 4,826,493 A | 5/1989 | Martini et al. |
| 4,880,592 A | 11/1989 | Martini et al. |
| 4,902,553 A | 2/1990 | Hwang et al. ............ 428/156 |
| 4,906,495 A | 3/1990 | Martini et al. |
| 4,946,720 A | 8/1990 | Oishi et al. |
| 5,009,648 A | 4/1991 | Aronoff et al. |
| 5,043,205 A | 8/1991 | Perazzo et al. |
| 5,110,390 A | 5/1992 | Martini et al. |
| 5,158,810 A | 10/1992 | Oishi et al. |

(Continued)

FOREIGN PATENT DOCUMENTS

CH    683 748 A5    5/1994

(Continued)

OTHER PUBLICATIONS

International Search Report and Written Opinion from PCT/US05/19496.

*Primary Examiner*—Melanie J Hand
(74) *Attorney, Agent, or Firm*—Marshall, Gerstein & Borun LLP

(57) ABSTRACT

A laminated material suitable for use in forming skin contacting products is disclosed. The laminated material comprises three distinct layers including a fabric layer, a film layer and an adhesive layer therebetween. The adhesive layer substantially continuously bonds the fabric layer to the film layer.

20 Claims, 1 Drawing Sheet

U.S. PATENT DOCUMENTS

| | | | |
|---|---|---|---|
| 5,407,713 A | 4/1995 | Wilfong et al. | |
| 5,417,677 A | 5/1995 | Schneider et al. | |
| 5,423,782 A | 6/1995 | Wolrich | |
| 5,455,091 A | 10/1995 | Oreglia et al. | |
| 5,468,526 A | 11/1995 | Allen et al. | |
| 5,470,624 A | 11/1995 | Oreglia et al. | |
| 5,496,295 A | 3/1996 | Wilfong et al. | |
| 5,567,488 A | 10/1996 | Allen et al. | |
| 5,567,489 A | 10/1996 | Allen et al. | |
| 5,582,820 A | 12/1996 | Yamamoto et al. | |
| 5,643,375 A | 7/1997 | Wilfong et al. | |
| 5,672,163 A | 9/1997 | Ferreira et al. | |
| 5,672,643 A | 9/1997 | Burns et al. | 524/90 |
| 5,690,622 A | 11/1997 | Smith et al. | |
| 5,730,919 A | 3/1998 | Wilfong et al. | |
| 5,753,342 A | 5/1998 | McBride et al. | 428/131 |
| 5,759,180 A | 6/1998 | Myhres | |
| 5,776,120 A | 7/1998 | Shelley et al. | |
| 5,800,928 A | 9/1998 | Fischer et al. | |
| 5,869,414 A | 2/1999 | Fischer et al. | |
| 5,879,341 A | 3/1999 | Odorzynski et al. | 604/367 |
| 5,895,694 A | 4/1999 | Zavadsky et al. | |
| 5,938,647 A | 8/1999 | Smith | |
| 5,983,604 A | 11/1999 | Wilfong et al. | |
| 5,989,235 A * | 11/1999 | Quacquarella et al. | 604/332 |
| 6,040,252 A | 3/2000 | Ootuka et al. | |
| 6,050,983 A | 4/2000 | Moore et al. | |
| 6,066,120 A | 5/2000 | Whiteside | |
| 6,096,420 A | 8/2000 | Wilhoit et al. | |
| 6,179,818 B1 | 1/2001 | Kydonieus et al. | 604/332 |
| 6,271,155 B1 * | 8/2001 | Noma et al. | 442/398 |
| 6,309,500 B1 | 10/2001 | Jensen et al. | |
| 6,329,465 B1 | 12/2001 | Takahashi et al. | |
| 6,451,912 B1 | 9/2002 | Kelch | 525/66 |
| 6,455,161 B1 | 9/2002 | Regnier et al. | |
| 6,479,154 B1 | 11/2002 | Walton et al. | 428/424.4 |
| 6,500,514 B1 | 12/2002 | Blemberg et al. | |
| 6,509,072 B2 | 1/2003 | Bening et al. | 428/35.4 |
| 6,558,809 B1 | 5/2003 | Kelch et al. | |
| 6,586,040 B1 | 7/2003 | von Falkenhausen | |
| 6,620,472 B1 | 9/2003 | Shepard et al. | |
| 6,620,474 B1 | 9/2003 | Regnier et al. | |
| 6,685,683 B1 | 2/2004 | Clok et al. | |
| 6,685,685 B2 | 2/2004 | Sugita et al. | |
| 6,713,140 B2 | 3/2004 | McCormack et al. | |
| 6,759,357 B1 | 7/2004 | Toriumi | |
| 6,766,817 B2 | 7/2004 | da Silva | |
| 6,918,404 B2 | 7/2005 | da Silva | |
| 7,066,586 B2 | 6/2006 | da Silva | |
| 2002/0064614 A1 | 5/2002 | Turnbull | |
| 2002/0081930 A1 | 6/2002 | Jackson et al. | |
| 2003/0077967 A1 | 4/2003 | Rock et al. | 442/312 |
| 2003/0114071 A1 * | 6/2003 | Everhart et al. | 442/414 |
| 2003/0120241 A1 | 6/2003 | Sorebo et al. | 604/385.02 |
| 2004/0082897 A1 * | 4/2004 | Rangel et al. | 602/59 |
| 2005/0112338 A1 | 5/2005 | Faulks et al. | 428/204 |

FOREIGN PATENT DOCUMENTS

| | | |
|---|---|---|
| EP | 0 366 802 A1 | 5/1990 |
| EP | 366802 A1 * | 5/1990 |
| EP | 1 022 127 A2 | 7/2000 |
| GB | 2 310 631 | 9/1997 |
| JP | 2002-302861 A | 0/2002 |
| JP | 10-109371 A | 4/1998 |
| JP | 2001-017469 A | 1/2001 |
| JP | 2003-275240 A | 9/2003 |
| JP | 2004106554 | 4/2004 |
| JP | 2004330692 | 11/2004 |
| JP | 2005-246811 A | 9/2005 |
| WO | WO 93/11938 | 6/1993 |
| WO | WO 02/09413 A2 | 1/2002 |
| WO | WO 2005/051273 A1 | 6/2005 |

* cited by examiner

LAMINATED MATERIAL AND SKIN CONTACTING PRODUCTS FORMED THEREFROM

REFERENCE TO RELATED APPLICATIONS

This is the United States National Phase under 35 U.S.C. §371 of International patent application no. PCT/US05/19496, filed Jun. 2, 2005, which is a continuation-in-part of U.S. patent application Ser. No. 10/861,560, filed Jun. 4, 2004, to which the present application claims priority.

FIELD OF THE DISCLOSURE

The present disclosure is generally directed to a new laminated material and, more particularly, a laminated material suitable for use in forming skin contacting products including by way of example body wearable collection devices.

BACKGROUND OF THE DISCLOSURE

Skin contacting products such as body wearable collection devices are formed of material(s) having certain known characteristics. If the collection device comprises a body waste collection pouch, these characteristics include the ability to receive and hold human body wastes of the type experienced in ostomy, continence and wound care for a determinable period of time while also typically serving as a satisfactory gas and odor barrier. Furthermore, it is desirable to form such skin contacting products of a material that has low noise characteristics so they remain relatively indiscernible during use.

For this purpose, there are commercially available films which are highly effective in many respects. These films are useful in devices generally capable of receiving and holding human body waste material and, if desired, also providing the requisite gas and odor barrier characteristics. However, the commercially available films are still often less than desirable in terms of certain other important characteristics.

In particular, films which are currently available are sometimes unacceptable as to "hand" or "feel". They have a tendency to stick against the body in hot or humid conditions and/or after showering, which is generally known to cause discomfort to the user of skin contacting products. Further, commercially available films have a tendency to produce an undesirable crinkling noise during movement.

To counteract these problems, it has heretofore been proposed to cover the film with a non-woven or other fibrous layer which is thermally secured to the surface of the film. It has been suggested that this covering arrangement will achieve sound-deadening as well as a better "hand" or "feel". However, by thermally securing the non-woven or other fibrous layer to the film, it has been found that the fibers of the non-woven or other fibrous layer become embedded within the film.

In a perhaps more accurate description, the interstices of the non-woven or other fibrous layer are filled with melted and solidified film material as a result of the thermal bonding process.

Unfortunately, thermally embedding fibers within the film has resulted in no significant noise reduction. The normal body movements of the user are found to still cause an undesirable crinkling noise. In addition, the non-woven or other fibrous layer adds comfort to the user but can snag on clothing at times.

In some instances, a non-woven or other fibrous layer is peripherally attached to the edges of a skin contacting product such as a body wearable collection device. This, too, serves to provide more comfort to the user, but it does not appreciably serve to reduce noise during user movement. Furthermore, previous attempts to overcome these problems have failed to overcome still other shortcomings that render such skin contacting products less than fully desirable to the user.

In particular, it is important for a body wearable collection device to greatly limit the degree of water cling following a shower. The previous attempts to thermally bond a non-woven or other fibrous layer to a film have failed to satisfy this particular characteristic. Additionally, a body wearable collection device should be manufactured of materials and with processes that are commercially desirable.

In the past, and by way of example, ostomy grade barrier films which meet the essential characteristics for ostomy have been expensive meaning that the cost of ostomy pouches to the user is high. While there are other commercially available films widely used in many other industries, they have typically been viewed as failing to exhibit characteristics essential for ostomy.

In addition to ostomy, it will be understood that similar problems are encountered with many different types of skin contacting products such as body wearable collection devices provided to receive urine, fecal matter, exudates and other liquid or flowable materials, as well as other types of skin contacting products provided to deliver liquid or flowable materials where noise reduction, comfort and/or limited water cling are important criteria.

For the foregoing reasons, it has remained to provide an entirely satisfactory laminated material that can advantageously be manufactured from many different commercially available films while exhibiting the foregoing desirable characteristics.

SUMMARY OF THE DISCLOSURE

Accordingly, the present disclosure is of a laminated material suitable for forming skin contacting products. The laminated material comprises three distinct material layers wherein the layers are integrally bonded. The three distinct material layers include a fabric layer, an adhesive layer and a thin film layer.

The laminated material utilizes a suitably thick layer of adhesive which permits use of a thin, commercially available film layer. The adhesive layer is between and substantially co-extensive with the facing surfaces of the film layer and the fabric layer. The suitably thick, co-extensive adhesive layer adds bulk to the thin film layer and penetrates the fibers of the fabric layer.

More specifically, the laminated material utilizes a thin, commercially available film layer and a suitably thick adhesive layer in thicknesses. The combined thickness of the film and the adhesive approximates the thickness of a typical ostomy grade barrier film. Some of the adhesive penetrates into the fabric layer to achieve excellent bonding of the three distinct material layers. Laminated material so formed has all of the essential characteristics of an ostomy grade barrier film. It also has low noise characteristics, excellent "hand" or "feel", and significantly reduced water cling characteristics. Furthermore, it permits the use of thin, commercially available films previously believed unsuitable for ostomy applications.

The fabric layer can comprise a knit fabric, a woven fabric or a non-woven fabric. The material for the fabric layer is preferably selected from nylon, polypropylene, polyester, or polyethylene or other polyolefins, or copolymers or blends thereof. The fabric layer can also comprise a sheath of a polyolefin having a core formed of any one or more of polypropylene, polyester and nylon. Alternatively, the material for the fabric layer can be a natural material such as cotton, silk, cellulosic tissue, or the like. If desired, the fabric can be treated with water repellant, or have water wicking fibers therein.

In some embodiments, the fabric is brushed, sueded, or sheared on at least one surface thereof.

As for the adhesive layer, it preferably comprises a hot melt adhesive wherein the adhesive forms a substantially continuous layer between the fabric layer and the film layer. It produces low noise characteristics, reduces water retention characteristics and adds bulk to the film layer. Also, the adhesive forming the layer may be activated or cured by utilizing chemical cross-linking agents, radio frequency, ultrasonic, e-beam, thermal, ultraviolet, or ambient temperature techniques.

With regard to the film layer, it is preferably formed as a multilayer film to have at least an odor barrier sublayer and a sealing sublayer. The odor barrier sublayer advantageously comprises polyamides, polyvinyl alcohol, ethylene vinyl alcohol, or polyvinylidene chloride materials. Preferably, the film layer is formed with the sealing sublayer of the film layer comprising polyethylene or other polyolefins or copolymers or blends thereof.

In an alternative construction, the film layer can comprise a monolithic film, i.e., a film having a single layer that possesses both odor barrier and sealing properties. In another alternative construction, the film layer does not need to have an odor barrier sublayer or odor barrier characteristics if the desired properties of the laminated material so permit.

Other objects, advantages and features of the present disclosure will become apparent from a consideration of the following specification taken in conjunction with the accompanying drawings.

DETAILED DESCRIPTION OF THE PREFERRED EMBODIMENT

Figure 1:
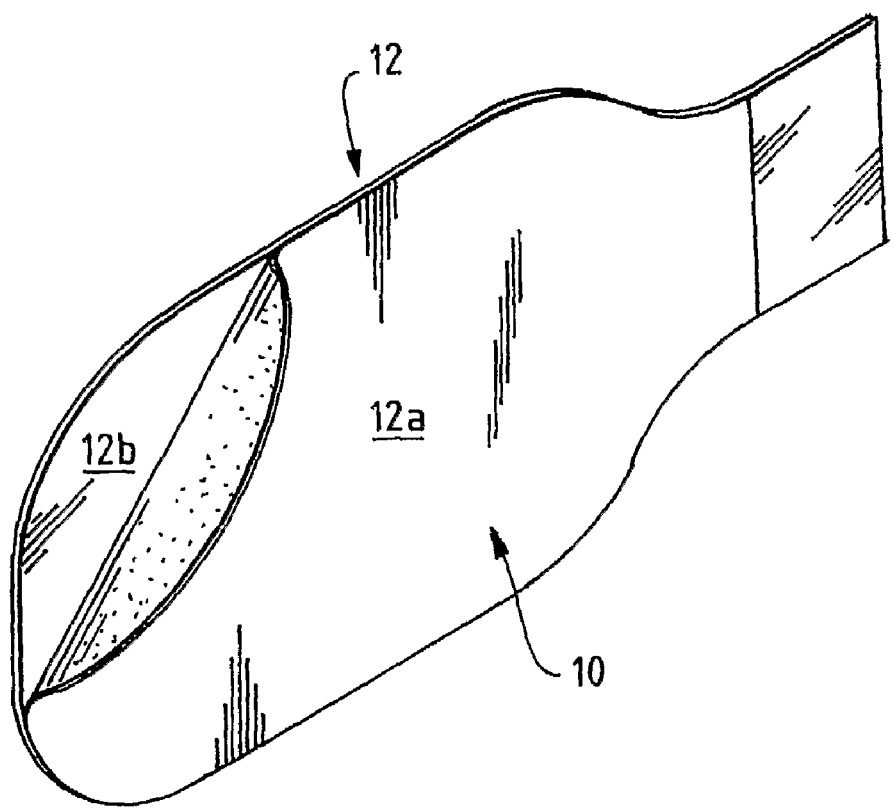
FIG. 1 is a perspective view of a skin contacting product formed from the laminated material of the present disclosure.
Figure 2:
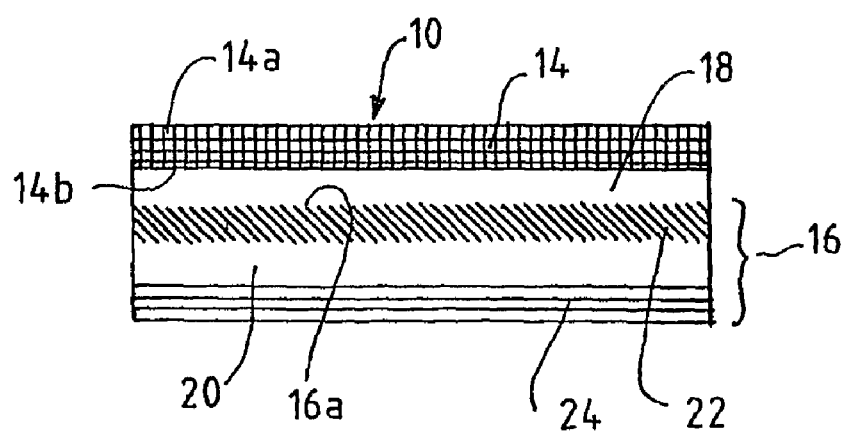
FIG. 2 is a schematic view which illustrates the construction of the laminated material of the present disclosure.

In the illustrations given, and with specific reference to FIGS. 1 and 2, a laminated material 10 suitable for use in forming a skin contacting product such as a body wearable collection device is disclosed. The collection device may, by way of example, comprise a body waste collection pouch having the ability to receive and hold human body wastes of the type experienced in ostomy, continence and wound care for a determinable period of time while also typically serving as a satisfactory gas and odor barrier. The collection device shown in FIG. 1 for purposes of illustration comprises an ostomy pouch 12. The ostomy pouch 12 advantageously includes a pair of pouch sidewalls 12a and 12b, and the laminated material 10 of each of the pouch sidewalls 12a and 12b comprises three distinct layers of material, i.e., a fabric layer 14, a film layer generally designated 16, and an adhesive layer 18 disposed therebetween. With this arrangement, the adhesive layer 18 may comprise an adhesive provided in such a manner as to substantially continuously bond the fabric layer 14 to the film layer 16.

Preferably, the fabric layer 14 comprises any of a knit fabric, a woven fabric or a non-woven fabric. The fabric layer 14 may be treated with a water repellant or have water wicking fibers therein, if desired. In addition, the fabric layer 14 may be brushed, sueded or sheared on at least one surface thereof, e.g., 14a.

As for the adhesive layer 18, it preferably comprises a hot melt adhesive applied in such a manner as to form a substantially continuous layer disposed between the fabric layer 14 and the film layer 16. The adhesive layer 18 may, by way of example, be applied to a surface of the fabric layer 14 and/or a surface of the film layer 16 by spraying it as a fine mist, or by extrusion coating, or by any other conventionally known coating technique. Further, the adhesive layer should be of a thickness that will not impair flexibility, but will maintain desired noise reduction characteristics, while producing a laminated material 10 soft enough to be comfortable to the wearer of a skin contacting product. In other words, the adhesive selected should not, e.g., be a hard brittle epoxy, since that would not be suitable because it is too stiff to achieve these objectives. The adhesive layer 18 may be activated or cured by utilization of chemical cross-linking agents, radio frequency, ultrasonic, e-beam, thermal, ultraviolet, or ambient temperature techniques.

With regard to the adhesive layer, the quantity of adhesive should be controlled in a manner dependent on the adhesive being used. Too much adhesive can cause the laminated material 10 to be sticky around the perimeter. For instance, the edges of the sidewalls 12a and 12b of a skin contacting product such as ostomy pouch 12 may be sticky. Too little adhesive can cause the laminated material 10 to have reduced adhesion. If the adhesion is inadequate, the natural flexing of the skin contacting product during use can produce undesirable increased noise.

The desired quantity of adhesive can be determined for each adhesive by trying various quantities sufficient to form a substantially continuous layer and testing for the absence of stickiness around the perimeter together with adequate adhesion upon flexing to maintain a desired low noise level.

The film layer 16 is a multilayer film having at least an odor barrier sublayer 20 comprised of polyamides, polyvinyl alcohol, ethylene vinyl alcohol, or polyvinylidene chloride materials, and at least a sealing sublayer 22. If the odor barrier sublayer 20 is comprised of polyvinylidene chloride, it will typically be used with additives such as plasticizers, and the sealing sublayer 22 may be comprised of a material such as polyethylene or other polyolefins or copolymers or blends thereof. If desired, the film layer 16 may comprise a multilayer film having multiple odor barrier layers such as 20 with at least one sealing layer 22 to form an outer sealing sublayer 16a of the film layer 16.

In one alternative construction, the film layer can comprise a monolithic film, i.e., a film having a single layer that possesses both odor barrier and sealing properties. In another alternative construction, the film layer need not have an odor barrier sublayer or odor barrier characteristics if the desired properties of the laminated material so permit.

As will be appreciated, the laminated material 10 comprises a material having three distinct layers, i.e., a fabric layer 14, a film layer 16, and an adhesive layer 18 therebetween. The laminated material 10 utilizes a suitably thick adhesive layer 18. For instance, the adhesive layer 18 may be approximately 1 mil in thickness, and bond to the film layer 16 to permit the use of a thin, commercially available film layer.

Depending upon the use of the laminated material 10, the exact thickness of the adhesive layer 18 may vary somewhat, but it will be provided with a thickness sufficient to preserve the essential characteristics of the material.

By way of example, and for application in a laminated material 10 for use in an ostomy pouch 12, an adhesive layer 18 approximately 1 mil in thickness will cooperatively bond to a thin, commercially available film layer 16, e.g., approximately 2½ mil in thickness, to provide needed assurance against leakage while at the same time providing fully satisfactory gas and odor barrier characteristics.

The adhesive layer 18 provides bulk to the thin, commercially available film layer 16 so that the total thickness of the two layers is approximately 3½ mil. This is comparable to the typical thickness of 3 to 4 mil for a commercial ostomy grade barrier film. As will be appreciated from FIG. 2, the adhesive layer is between and substantially co-extensive with the outer sealing sublayer 16a of the film layer 16 and the inner facing surface 14b of the fabric layer 14.

The fabric layer 14 is shown schematically in FIG. 2 with the cross-hatching representing fibers of the fabric. The adhesive layer 18 is sufficiently thick that it not only bonds to the outer sealing sublayer 16a of the film layer 16, but also penetrates into the fibers of the fabric layer 14 to achieve excellent bonding of the three distinct material layers 14, 16 and 18. In addition, the laminated material 10 comprises a composite that exhibits a number of extraordinary characteristics.

With the laminated material 10, the resulting composite has all of the essential characteristics of an ostomy grade barrier film. In addition, it exhibits low noise characteristics, excellent "hand" or "feel", and significantly reduced water cling characteristics. Further, it permits the use of a thin, commercially available film of a type previously not known or believed to be suitable for ostomy applications.

Presently, it is believed the results follow from utilizing a suitably thick adhesive layer 18 between a fabric layer 14 and a thin, commercially available film layer 16. The adhesive layer 18 achieves secure surface-to-surface bonding to what is generally viewed as a "noisy", inadequate film product for ostomy and also achieves penetration into the fibers of the fabric layer 14. The secure surface-to-surface bonding of the adhesive layer 18 to the film layer 16, as well as secure penetration bonding of the adhesive to the fabric layer 14, is believed to provide the low noise characteristics. The penetration bonding between the adhesive layer 18 and the fabric layer 14 is also believed to reduce water cling by approximately 50% in relation to fabric which is thermally bonded to film about the perimeter thereof. The laminated material 10 also exhibits excellent "hand" or "feel" since the thickness of the adhesive layer 18 is insufficient to permit adhesive to reach the outer surface 14a of the fabric layer 14.

In testing, it has been found that the laminated material 10 exhibits a decibel level of approximately 50% less than the decibel level of a commercially available ostomy material used in a product sold under the trademark "First Choice" by Hollister Incorporated and that the laminated material 10 exhibits about 50% less water cling than an ostomy control material.

The laminated material 10 was tested for quietness by forming a 4 inch by 4 inch sample into a cylinder and mounting it on a test fixture with one end of the cylinder was held fixed and the other end was rotated about the axis of the cylinder at an angle of 15° at 70 cycles per minute. Noise emissions produced by the film's flexing were analyzed with a sound level meter. For comparison, the same test was conducted on a control material comprising the ostomy material used on the Hollister Incorporated "First Choice" product with a seal on one edge to simulate an ostomy pouch sealed only on the perimeter of the pouch.

In particular, the laminated material which was tested utilized a non-woven fabric layer comprising spun bonded polyethylene of 40 gms/m², an adhesive layer comprising hot melt thermoplastic adhesive, and a film layer comprising a multi-layer film having polyethylene skins and a core of nylon. The results were as follows:

| Sample | dBA | dB, 8 kHz | db, 16 kHz |
|---|---|---|---|
| Control Material | 67.8 | 49 | 40.6 |
| Laminated Material | 68.8 | 55.4 | 53.2 |
| Film Layer Only | | | |
| Laminated Material | 49.1 | 17.4 | 18.6 |

In this table, dBA is a weighted average that takes into account the human perception of noise over the entire frequency range. The dB values in the 8 and 16 kHz octave bands are indicative of the noise in the higher frequency range and represent crispness of the noise. The dBA and dB values therefore reveal that the laminated material 10 is considerably quieter than the control material.

With regard to water cling, the laminated material 10 was also tested for water retention relative to a control material comprising a non-woven sealed at the edges to a film. This was done by cutting multiple 4⅜ inch circular samples of the laminated material 10 and the control material, and providing each of the samples with a 4 inch inner diameter sealer using a ⅛ inch seal width. The circular samples cut from the laminated material 10 and the control sample were then individually weighed and clamped in place one at a time under a 4 inch cylinder. A quantity of 100 ml of a 1% soapy water solution was poured into the cylinder after each of the circular samples was clamped in place. The soapy water solution was poured out after a period of 2 minutes for each of the circular samples and the samples were each placed between an equal number of layers of disposable towel. After placement between the layers of disposable towel, each circular sample was run through a nip to blot up any surface water and then reweighed to measure the water retained.

For the multiple circular samples of the laminated material 10, 0.010 grams of soapy water was retained on average whereas for the multiple circular samples of the control material, 0.023 grams of soapy water was retained on average.

This procedure is a modification of the TAPPI test method T441-OM-98, also known as the "Cobb Test".

While specifically described by way of example in connection with ostomy applications, it will be appreciated that the laminated material 10 can be used for any skin contacting product of the types previously mentioned herein while achieving the results described.

Therefore, the laminated material 10 is a material that may be utilized to manufacture any skin contacting product. The laminated material 10 may be comprised of various natural or synthetic fabrics and/or fabric treatments and, thus, the fabric layer 14 may comprise the same fabric and/or fabric treatment on both sides, or a different fabric and/or fabric treatment on the side facing the skin of the user from that on the side facing the user's clothing depending upon the exact nature and purpose of the skin contacting product. However, the laminated material 10 is comprised of three distinct layers, i.e., a fabric layer 14, a film layer 16 and an adhesive layer 18.

The fabric layer 14 can be comprised of a knit fabric, a woven fabric or a non-woven fabric. The material for the fabric layer 14 is preferably selected from nylon, polypropylene, polyester, or polyethylene or other polyolefins or copolymers or blends thereof. The fabric layer 14 can also be comprised of a sheath of a polyolefin having a core formed of any one or more of polypropylene, polyester and nylon. Alternatively, the material for the fabric layer 14 can be a natural material such as cotton, silk, cellulosic tissue, or the like. Additionally, if desired, the fabric can be treated with water repellant, or have water wicking fibers therein.

In view of the above, the fabric layer 14 may not only be treated with a water repellant or have water wicking fibers, but it may also be brushed, sueded or sheared, and any combination of these characteristics can be utilized on one side, both sides, or neither side thereof, depending upon the desired characteristics for the laminated material 10.

Still additionally, the fabric layer 14 may typically be laminated to the film layer 16 in such a manner that a brushed, sueded, or sheared side comprises the outwardly facing side 14a of the fabric layer. This outwardly facing side 14a may face toward the skin of the user, in which case it may be thought of as a comfort panel, and/or it may face the user's clothing; in either case, treating the fabric so it is brushed, sueded, or sheared is optional. Further, it is also possible for the fabric layer 14 to be laminated to the film layer 16 in such a manner that a brushed, sueded, or sheared side comprises the inwardly facing side 14b of the fabric layer 14.

When a brushed, sueded, or sheared side of the fabric layer 14 comprises the inwardly facing side 14b, it will be the side that is penetration bonded to the adhesive layer 18 which may be beneficial in causing the adhesive layer to penetrate and bind to the fibers of the fabric making up the fabric layer.

As for which option is selected in practice, it will depend upon the physical characteristics that are desired by the end users of skin contacting products such as the ostomy pouch 12. The fabric layer 14 may incorporate water wicking fibers on the side of such products which face the body of the user to draw perspiration or moisture away from the body. The fabric layer 14 may also be treated with a water repellant on the side opposite the body of the user to provide for quick drying after a user has showered. The water repellant coupled with the effects of the penetration bonding of the adhesive layer 18 with the fibers in the fabric of the fabric layer 14 will enhance resistance to water cling. Further, the placement and use of the brushed, sueded, or sheared side of the fabric layer 14 can be determined based on the desired coefficient of friction and/or "hand" or "feel" of the outwardly facing side 14b.

By providing substantially continuous bonding of the fabric layer 14 to the film layer 16 with a third, distinct adhesive layer 18, which may be formed using an adhesive, the objectionable crinkling sound typical of films such as those used in ostomy during movement of the user is largely, if not entirely, eliminated.

If desired, the film layer 16 can comprise a multilayer film having up to about 8 layers which makes it possible to provide for multiple odor barrier layers such as 20. In addition, the film layer 16 can comprise a multilayer film having a sealing sublayer on one side 22 or both sides 22 and 24 depending upon the desired film characteristics. Alternatively, the film layer 16 can comprise a monolithic film, i.e., a film which includes a single layer with or without odor barrier characteristics.

As will be appreciated, the laminated material 10 is well suited for any skin contacting product including without limitation body wearable collection devices such as body waste collection pouches. The latter products are generally of the type that include the ability to receive and hold human body wastes such as those experienced in ostomy, continence and wound care. For such products, as well as other skin contacting products, it is desirable to form them of a material that has low noise characteristics so they remain relatively indiscernible during use.

While in the foregoing there has been described a preferred embodiment of the disclosure, it will be appreciated that the details herein given may be varied by those skilled in the art without departing from the true spirit and scope of the appended claims.

What is claimed is:

1. A sidewall of a body-wearable pouch for the collection of human body wastes, said sidewall formed of a laminated material comprising three distinct layers including a heat sealable fabric layer, a multi-layer film having an odor barrier sublayer and a separate thermoplastic adhesive layer therebetween, the adhesive layer being a hot melt thermoplastic adhesive that is substantially coextensive with facing surfaces of the fabric layer and the film layer so as to substantially continuously bond the fabric layer to the film layer, said laminated material being neither soluble nor disintegratable in water, and wherein the thermoplastic layer has a thickness of approximately 1 mil, the film and adhesive layers have a total thickness of approximately 3½ mil, and the adhesive layer penetrates into the fabric layer.

2. The sidewall of claim 1 wherein the fabric layer is comprised of a synthetic fabric.

3. The sidewall of claim 1 wherein the fabric layer includes fibers comprising nylon, polypropylene, polyester, polyethylene or a sheath of polyolefin having a core disposed therein.

4. The sidewall of claim 3 wherein the core is comprised of any one or more of polypropylene, polyester and nylon.

5. The sidewall of claim 1 wherein the fabric layer is treated with water repellant or has water wicking fibers therein.

6. The sidewall of claim 1 wherein the film layer is a multilayer film having a sealing sublayer.

7. The sidewall of claim 6 wherein the odor barrier sublayer is comprised of polyamide, polyvinyl alcohol, ethylene vinyl alcohol, or polyvinylidene chloride.

8. The sidewall of claim 6 wherein the sealing sublayer is comprised of polyethylene or other polyolefins or copolymers or blends thereof.

9. An ostomy pouch having at least one sidewall including a laminated material, the laminated material comprising:
   three distinct layers including a fabric layer, a film layer, and an adhesive layer therebetween bonding the fabric layer to the film layer;
   the fabric layer being comprised of nylon, polypropylene, polyester, polyethylene or other polyolefins or copolymers or blends thereof, or a polyolefin sheath having a core disposed therein;
   the film layer being a multilayer film having at least one odor barrier sublayer and at least one sealing sublayer, the odor barrier sublayer being comprised of polyamide, polyvinyl alcohol, ethylene vinyl alcohol, or polyvinylidene chloride, and the sealing sublayer being comprised of polyethylene or other polyolefins or copolymers or blends thereof; and
   the adhesive layer comprising a hot-melt thermoplastic adhesive substantially continuously integrally bonding the fabric layer to the sealing sublayer of the film layer, and wherein the adhesive layer has a thickness of approximately 1 mil, the film and adhesive layers have a total thickness of approximately 3½ mil, and the adhesive layer penetrates into the fabric layer.

10. The ostomy pouch of claim 9 wherein the film layer is a multilayer film having multiple odor barrier sublayers and at least one sealing sublayer to form a sealing side of the film layer.

11. In a skin contacting product having sidewalls, the skin contacting product being a body wearable pouch for collecting human body waste, each of the sidewalls comprising:

a laminated material having three distinct layers including a fabric layer, a multi-layer film layer having an odor barrier sublayer, and an adhesive layer therebetween, the adhesive layer substantially continuously bonding the fabric layer to the film layer.

12. The skin contacting product of claim 11 wherein the fabric layer includes fibers comprising nylon, polypropylene, polyester, polyethylene or other polyolefins or copolymers or blends thereof, or a sheath of a polyolefin having a core.

13. The skin contacting product of claim 12 wherein the core is comprised of any one or more of polypropylene, polyester and nylon.

14. The skin contacting product of claim 11 wherein the fabric layer is treated with water repellant.

15. The skin contacting product of claim 11 wherein the adhesive is a hot melt adhesive.

16. The skin contacting product of claim 11 wherein the adhesive layer is activated or cured by using chemical cross-linking agents, radio frequency, ultrasonic, e-beam, thermal, ultraviolet, or ambient temperature techniques.

17. The skin contacting product of claim 11 wherein the layer is a multilayer film having a sealing sublayer.

18. The skin contacting product of claim 11 wherein the odor barrier sublayer is comprised of polyamide, polyvinyl alcohol, ethylene vinyl alcohol, or polyvinylidene chloride.

19. The skin contacting product of claim 17 wherein the sealing sublayer is comprised of polyethylene or other polyolefins or copolymers or blends thereof.

20. The skin contacting product of claim 11 wherein the sidewalls are formed to define an ostomy pouch.

* * * * *